US007783315B2

(12) United States Patent
Iyer et al.

(10) Patent No.: US 7,783,315 B2
(45) Date of Patent: Aug. 24, 2010

(54) METHOD AND APPARATUS FOR PROVIDING PUSH-TO-TALK SERVICES IN A CELLULAR COMMUNICATION SYSTEM

(75) Inventors: Prakash R. Iyer, North Andover, MA (US); Murali Aravamudan, Windham, NH (US); Ajit Rajasekharan, East Brunswick, NJ (US)

(73) Assignee: Motorola, Inc., Schaumburg, IL (US)

( * ) Notice: Subject to any disclaimer, the term of this patent is extended or adjusted under 35 U.S.C. 154(b) by 923 days.

(21) Appl. No.: 11/273,694

(22) Filed: Nov. 14, 2005

(65) Prior Publication Data
US 2006/0063553 A1 Mar. 23, 2006

Related U.S. Application Data

(62) Division of application No. 11/002,767, filed on Dec. 2, 2004, now abandoned.

(60) Provisional application No. 60/533,842, filed on Dec. 31, 2003.

(51) Int. Cl.
H04B 7/00 (2006.01)
(52) U.S. Cl. .................. 455/519; 379/67.1; 455/567
(58) Field of Classification Search .......... 455/517–519
See application file for complete search history.

(56) References Cited

U.S. PATENT DOCUMENTS

| 4,821,310 | A  | * | 4/1989 | Lynk et al. ............. 455/517 |
| 5,711,011 | A  | * | 1/1998 | Urs et al. ............... 455/520 |
| 2003/0119536 | A1 | * | 6/2003 | Hutchison ............. 455/517 |
| 2003/0148779 | A1 |   | 8/2003 | Aravamudan et al. |

OTHER PUBLICATIONS

PCT Search Report and Written Opinion mailed Aug. 14, 2008, PCTUS2004/43510, corresponding application.

* cited by examiner

*Primary Examiner*—Nay A Maung
*Assistant Examiner*—Angelica M Perez
(74) *Attorney, Agent, or Firm*—Steven A. May (57) ABSTRACT

To reduce a delay between a time that a user of an originating mobile station (MS) requests to set up a Push-To-Talk (PTT) call and the time that the user may begin to speak, a communication system provides a 'wake up list' of other mobile stations (MSs) that may be awakened prior to the originating MS requesting to set up a PTT call. To further reduce the delay, the user may begin speaking prior to completion of the call setup. The speech is stored and is conveyed to a called MS when the call is setup. If the call does not get setup or a user of the called MS is not present, the stored speech may be conveyed to the called MS as a voice message. The stored speech, or new speech, may also be used as an announcement of a call instead of the typical "beep" or "chirp."

8 Claims, 7 Drawing Sheets

METHOD AND APPARATUS FOR PROVIDING PUSH-TO-TALK SERVICES IN A CELLULAR COMMUNICATION SYSTEM

CROSS-REFERENCE(S) TO RELATED APPLICATION(S)

The present application is a divisional application of U.S. patent application Ser. No. 11/002,767, entitled "METHOD AND APPARATUS FOR PROVIDING PUSH-TO-TALK SERVICES IN A CELLULAR COMMUNICATION SYSTEM," filed Dec. 2, 2004, now abandoned and claims priority thereto. The present application further claims priority from provisional application Ser. No. 60/533,842, entitled "METHOD AND APPARATUS FOR PROVIDING PUSH-TO-TALK SERVICES IN A CELLULAR COMMUNICATION SYSTEM," filed Dec. 31, 2003, which is commonly owned and incorporated herein by reference in its entirety.

FIELD OF THE INVENTION

The present invention relates generally to cellular communication systems, and, in particular, to provision of Push-To-Talk communication services in an interconnect cellular communication system.

BACKGROUND OF THE INVENTION

Recently it has been proposed to add dispatch capabilities to Code Division Multiple Access (CDMA) communications systems, such as a cdma2000 communication system. Unlike the interconnect services provided by today's cellular systems, dispatch services have been traditionally provided by two-way radio systems. Traditional dispatch services typically allow for instant access by a mobile station originating a call to a target mobile station. For example, a dispatch group call service enables a user to communicate with a group of people simultaneously and instantaneously, typically by depressing a Push-To-Talk (PTT) key. Using a cellular system, such a call could not occur instantaneously since either telephone numbers would need to be dialed for a three-way call or arrangements would need to be made to setup a conference call. A dispatch point-to-point call service enables a user to communicate with another user quickly and spontaneously, again typically by depressing a PTT key. This feature is ideal for two people who are working together but are unable to speak with one another directly such as two people working in concert but in different parts of a building. Where a wireless telephone call may be more appropriate for a conversation, short messages between two people as they work are better facilitated by the dispatch point-to-point call service.

Low delay is a critical factor in any dispatch call. For example, setup delay that is acceptable for a typical interconnect voice call can be unacceptable for dispatch services which rely on a very fast connection being made to the called party. Accordingly, dispatch services provide an instant access call setup. However, a problem in implementing a dispatch system in a cellular communication system is that the average time that it takes a user to navigate a phone book appearing on a display screen of a cellular phone, select an entry, and then set up a PTT phone call is anything but instantaneous.

In the proposals for implementation of dispatch in a CDMA system, it typically takes approximately 3-4 seconds to initiate a PTT phone call by a user of an originating cellular phone, that is, to depress a PTT key after getting to the cellular phone's phone book. Upon the user selecting an entry and depressing the PTT key, the cellular phone conveys a call origination message to the infrastructure identifying one or more cellular phones or a talkgroup associated with the selected entry. In response to receiving the call origination message, the infrastructure conveys a paging message to the one or more identified cellular phones or to one or more cellular phones associated with the identified talkgroup. In response to receiving the page, each called cellular phone wakes up and conveys a page response back to the infrastructure. A PTT phone call is then set up. This process of waking up a called cellular phone and establishing a PTT phone call may take another 3-4 seconds. In addition, the user of the originating cellular phone is not permitted to speak until receiving a Talk Permit Tone (TPT), which is not conveyed to the user until traffic channels are established between the infrastructure and the one or more called cellular phones. As a result, 9-10 seconds may expire between a time that the user of the originating cellular phone determines to initiate a PTT phone call and a time that the user is permitted to speak.

Therefore, a need exists for a method and apparatus that reduces a delay before conversation may be initiated in a PTT phone call in a cellular communication system.

DETAILED DESCRIPTION OF THE INVENTION

To address the need for a method and an apparatus that reduces a delay before conversation is initiated in a PTT phone call, a communication system is provided that provides, in association with an originating mobile station (MS), a 'wake up' list of other mobile stations (MSs) that may be awakened prior to the originating MS requesting to set up a PTT call. To further reduce the delay, the user may begin speaking prior to completion of the call setup. The speech is stored and is conveyed to a called MS when the call is setup.

If the call does not get setup or a user of the called MS is not present, the stored speech may be conveyed to the called MS as a voice message. The stored speech, or new speech, may also be used as an announcement of a call instead of the typical "beep" or "chirp."

Generally, an embodiment of the present invention encompasses a method for establishing a Push-To-Talk (PTT) communication session in a wireless communication system. The method includes receiving a request to wake up a mobile station, in response to receiving the request to wake up a mobile station, waking up the mobile station, and receiving a request to set up a PTT communication session with the mobile station, wherein the request to set up a PTT communication session is received after receipt of the request to wake up the mobile station.

Another embodiment of the present invention encompasses a method for establishing a PTT communication session in a wireless communication system. The method includes receiving a request from a user of a mobile station to set up a PTT communication session, receiving speech from the user of the mobile station prior to completion of the set up of the communication session, storing the received speech to produce stored speech, and, when set up of the communication session is completed, conveying the stored speech.

Yet another embodiment of the present invention encompasses a method for establishing a PTT communication session in a wireless communication system. The method includes receiving a request from a user of a first mobile station to set up a PTT communication session, receiving speech from the user, and conveying the received speech as an alert to a second mobile station.

Still another embodiment of the present invention encompasses a control switch comprising a processor that receives a request to wake up a mobile station, in response to receiving the request to wake up a mobile station, wakes up the mobile station, and receives a request to set up a PTT communication session with the mobile station, wherein the request to wake up a mobile station is received prior to receipt of the request to set up a PTT communication session with the mobile station.

Yet another embodiment of the present invention encompasses a mobile station that receives an indication from a user of the mobile station of the user's desire to initiate a PTT communication session, in response to receiving the indication, conveys a request to wake up another mobile station, and subsequent to receiving the indication from the user of the user's desire to initiate a Push-To-Talk (PTT) communication session, and receives an instruction from the user to set up a PTT communication session.

Still another embodiment of the present invention encompasses a mobile station that receives a request from a user of the mobile station to set up a PTT communication session, receives speech from the user of the mobile station prior to completion of the set up of the communication session, stores the received speech to produce stored speech and, when set up of the communication session is completed, and conveys the stored speech.

Yet another embodiment of the present invention encompasses a mobile station that receives a request from a user of the mobile station to set up a PTT communication session, receives speech from the user, and conveys the received speech as an alert to another mobile station.

Figure 1:
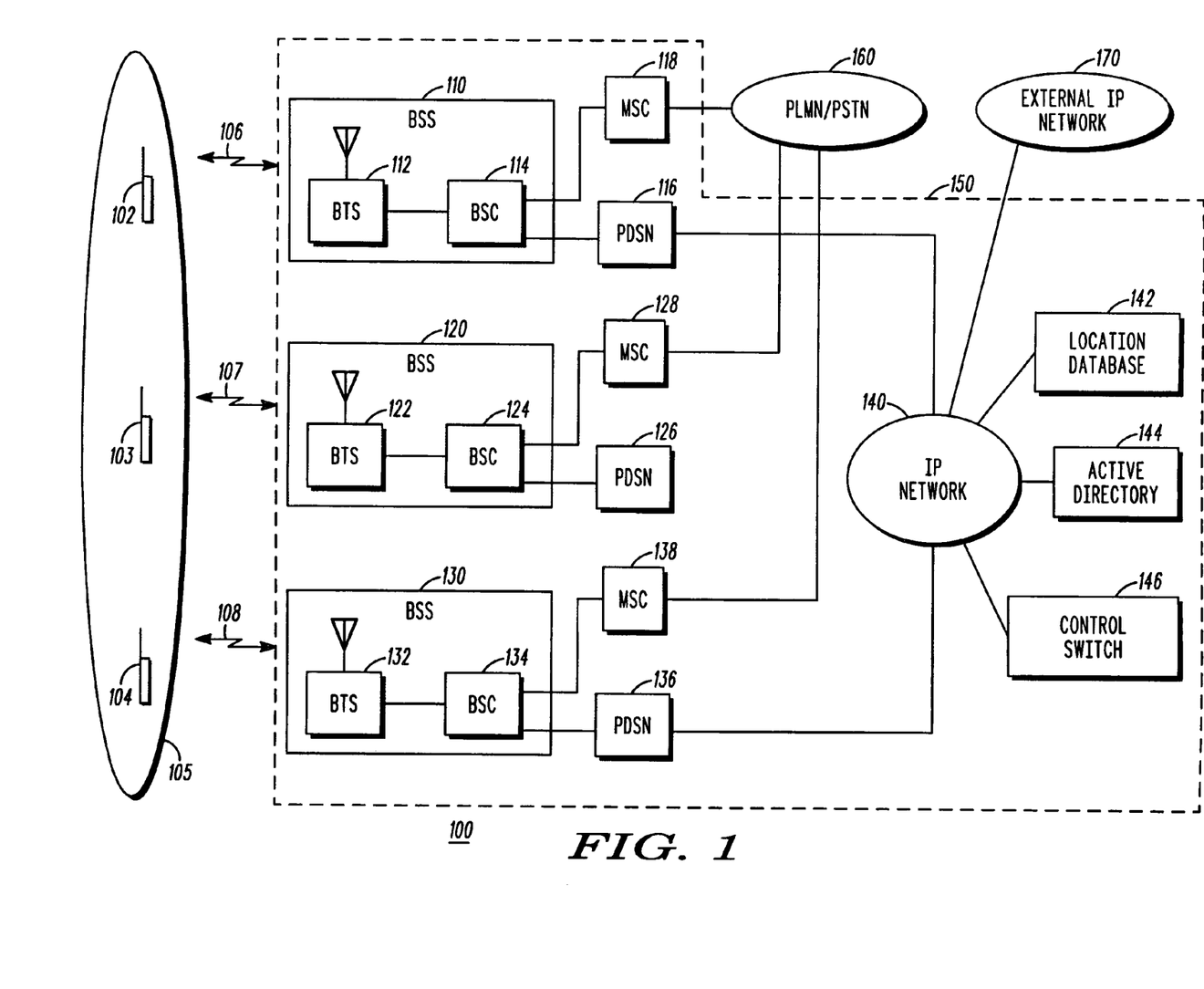
FIG. 1 is a block diagram of a wireless communication system in accordance with an embodiment of the present invention.

The present invention may be more fully described with reference to FIGS. 1-6B. FIG. 1 is a block diagram of a wireless communication system 100 in accordance with an embodiment of the present invention. Communication system 100 includes multiple Base Station Systems (BSSs) 110, 120, 130 (three shown). Each BSS of the multiple BSSs 110, 120, 130 includes a respective Base Transceiver Station (BTS) 112, 122, 132 that is operably coupled to a respective Base Station Controller (BSC) 114, 124, 134. Each BSS of the multiple BSSs 110, 120, 130 is operably coupled to a respective Packet Data Service Node (PDSN) of multiple PDSNs 116, 126, 136. Although not shown, communication system 100 may further include a Packet Control Function (PCF) or a Packet Control Unit (PCU) included in each BSC 114, 124, 134 or interposed between each such BSC and a respective PDSN 116, 126, 136. Each BSS of the multiple BSSs 110, 120, 130 is further coupled to a respective Mobile Switching Center (MSC) of multiple MSCs 118, 128, 138. However, those who are of ordinary skill in the art realize that one or more of BSSs 110, 120, and 130 may share a PDSN and/or an MSC, rather than being coupled to a separate PDSN and MSC, without departing from the spirit and scope of the present invention.

Communication system 100 further comprises multiple mobile stations (MSs) 102, 103, 104 (three shown) that are each a member of a talkgroup 105. Each MS of the multiple MSs 102-104 is in wireless communication with a respective BSS of the multiple BSSs 110, 120, 130. Each BSS 110, 120, 130 provides communications services to a respective MS 102-104 via a respective air interface 106, 107, 108 that includes a forward link and a reverse link. Each forward link includes a paging channel, at least one forward link control channel, and at least one forward link traffic channel. Each reverse link includes a reverse link access channel, at least one reverse link control channel, and at least one reverse link traffic channel.

Each MSC 118, 128, 138 further connects to a public network, such as a Public Land Mobile Network (PLMN) or a Public Switched Telephone Network (PSTN) 160, thereby providing a circuit switched network for a communication session involving any one or more of MSs 102-104. Each PDSN 116, 126, 136 further connects to an Internet Protocol (IP) network 140, thereby providing a packet switched network for a communication session involving any one or more of MSs 102-104. Communication system 100 further includes a Location Database 142, an Active Directory 144, a Packet Data Control Switch 146, and a Presence Server 148 that are each operably coupled to IP network 140. Through IP network 140, each PDSN 116, 126, 136, and thereby each BSS 110, 120, 130 and MS 102-104, is able to access Location Database 142, Active Directory 144, and Packet Data Control Switch 146. Communication system 100 further includes an external IP network 170, such as the Internet, that is operably coupled to IP network 140. BSSs 110, 120, and 130, PDSNs 116, 126, and 136, MSCs 118, 128, and 138, IP network 140, Location Database 142, Active Directory 144, and Packet Data Control Switch 146 are collectively referred to herein as an infrastructure 150 of communication system 100.

Location Database 142 maintains a record of a mobile identifier (mobile ID) associated with each MS 102-104 active in communication system 100 and further maintains and tracks provisioning and mobility information with respect to each such MS, including registration of the MS when the MS activates in communication system 100. Among the information maintained in Location Database 142 is a location of each MS 102-104 active in communication system 100, such as a BSS serving the MS. Location Database 142 may be implemented in a Home Location Register (HLR) or a Visited Location Register (VLR) as known in the art, or a combination of a HLR and a VLR, or a combination of one or more HLRs and/or VLRs.

Active Directory 144, also known as a Group Call Registry ("GCR"), comprises a database system containing the talkgroup, or user group, data. Active Directory 144 maintains a definition of all talkgroups, such as talkgroup 105, in the system 100, including a talkgroup identifier (talkgroup ID) that is uniquely associated with each talkgroup and, in association with the talkgroup ID, a list of mobile identifiers (mobile IDs) that are uniquely associated with MSs, such as MSs 102-104, that are members of the talkgroup. When an inquiry to Active Directory 144 specifies a talkgroup identifier, that is, requests a definition of a specified talkgroup, in response the directory provides a list of mobile IDs associated with the members of the specified talkgroup. For example, in response to an inquiry specifying a talkgroup ID associated with talkgroup 105, Active Directory 144 may provide the mobile IDs associated with MSs 102-104.

Packet Data Control Switch 146 comprises a Push-to-Talk (PTT) server that implements group call logic. Preferably, Packet Data Control Switch 146 operates as described in U.S. patent application Ser. No. 09/721,329, filed Nov. 22, 2000, and entitled "System and Method of Servicing Mobile Communications with a Proxy Switch," which application is assigned to the assignee of the present application and is hereby incorporated herein in its entirety. Packet Data Control Switch 146 detects a group call initiation by a respective member of a talkgroup, such as one of MSs 102-104 with respect to talkgroup 105, and automatically attempts to connect all of the members of the group in a group call.

Figure 2:
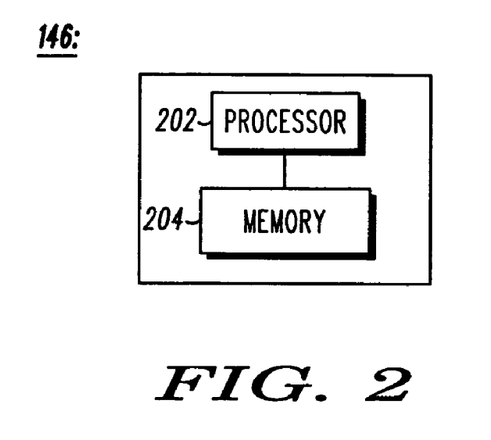
FIG. 2 is a block diagram of a Packet Data Control Switch of FIG. 1 in accordance with an embodiment of the present invention.

FIG. 2 is a block diagram of Packet Data Control Switch 146 in accordance with an embodiment of the present invention. Packet Data Control Switch 146 includes a processor 202, such as one or more microprocessors, microcontrollers, digital signal processors (DSPs), combinations thereof or such other devices known to those having ordinary skill in the art. Packet Data Control Switch 146 further includes at least one memory device 204 associated with processor 202, such as random access memory (RAM), dynamic random access memory (DRAM), and/or read only memory (ROM) or equivalents thereof, that store data and programs, such as group call programs, that may be executed by the processor and that allow the Packet Data Control Switch to perform all functions necessary to operate in communication system 100.

Figure 3:
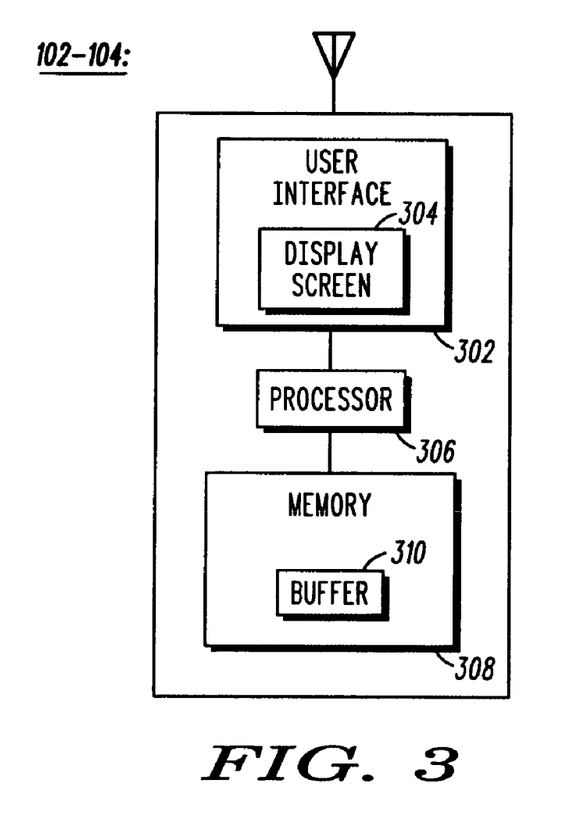
FIG. 3 is a block diagram of a mobile station of FIG. 1 in accordance with an embodiment of the present invention.

FIG. 3 is a block diagram of a mobile station (MS), such as MSs 102-104, in accordance with an embodiment of the present invention. Each MS of the multiple MSs 102-104 includes a user interface 302 coupled to a processor 306, such as one or more microprocessors, microcontrollers, digital signal processors (DSPs), combinations thereof or such other devices known to those having ordinary skill in the art. Each MS further includes at least one memory device 308 associated with processor 306, such as random access memory (RAM), dynamic random access memory (DRAM), and/or read only memory (ROM) or equivalents thereof, that store data and programs that may be executed by the processor and that allow the MS to perform all functions necessary to operate in communication system 100.

User interface 302 provides a user of the MS with the capability of interacting with the MS, including inputting instructions into the MS. In one embodiment of the present invention, user interface 302 includes a display screen 304 and a keypad that includes multiple keys, including a Push-to-Talk (PTT) key, that may be used by a user of the MS to input instructions into the MS. In another embodiment of the present invention, display screen 304 comprises a touch screen that is able to determine a position (i.e., an X-coordinate and a Y-coordinate) of a user's touch on the touch screen and convey the position data to processor 306. Based on the position data, processor 306 then translates the user's touch into an instruction. Preferably, display screen 304 may display a "keypad" screen that comprises multiple softkeys, such as softkeys corresponding to keys on a conventional cellular telephone keypad and further including a PTT softkey.

The at least one memory device 308 maintains a mobile ID that is uniquely associated with the MS. The at least one memory device 308 further maintains a phone book comprising identifiers associated with MSs and/or talkgroups, such as mobile identifiers (mobile IDs) that are each uniquely associated with an MS and talkgroup identifiers (mobile IDs) that are each uniquely associated with a talkgroup, that may be engaged in a PTT communication session. The mobile IDs may be preprogrammed into the at least one memory device 308 or may be added to the at least one memory device by a user of the MS. When the MS is a member of a talkgroup, such as talkgroup 105, the at least one memory device 308 may further store, in association with the talkgroup, a talkgroup ID and an associated list of mobile IDs, wherein each mobile ID in the list of mobile IDs corresponds to an MS that is a member of the talkgroup.

Communication system 100 further maintains a 'wake up list' in association with each MS of the multiple MSs 102-104 included in the communication system. Each wake up list may be stored in the at least one memory device 308 of a corresponding MS or may be stored in infrastructure 150, and in particular in the at least one memory device 204 of Packet Data Control Switch 146. In one embodiment of the present invention, each wake up list comprises a list of mobile IDs associated with each MS that may be awakened by communication system 100 in response to receipt, by infrastructure 150, of a wake up request from the corresponding MS. In another embodiment of the present invention, each wake up list may comprise a list of talkgroup IDs associated with talkgroups whose members may be awakened by communication system 100 in response to receipt, by infrastructure 150, of a wake up request from the corresponding MS. In yet another embodiment of the present invention, each wake up list may comprise a list of a combination of mobile IDs and talkgroup IDs. When the wake up list is stored in infrastructure 150, the wake up list further comprises the mobile ID of the MS corresponding to the wake up list.

Preferably, communication system 100 is a Code Division Multiple Access (CDMA) communication system, in which communication channels of a forward link or a reverse link, such as access channels, control channels, paging channels, and traffic channels, comprise orthogonal codes, such as Walsh Codes, that are transmitted in a same frequency bandwidth. However, those who are of ordinary skill in the art realize that communication system 100 may operate in accordance with any wireless telecommunication system, such as but not limited to a Global System for Mobile Communications (GSM) communication system, a Universal Mobile Telecommunication System (UMTS) communication system, a Time Division Multiple Access (TDMA) communication system, a Frequency Division Multiple Access (FDMA) communication system, or an Orthogonal Frequency Division Multiple Access (OFDM) communication system.

Figure 4:
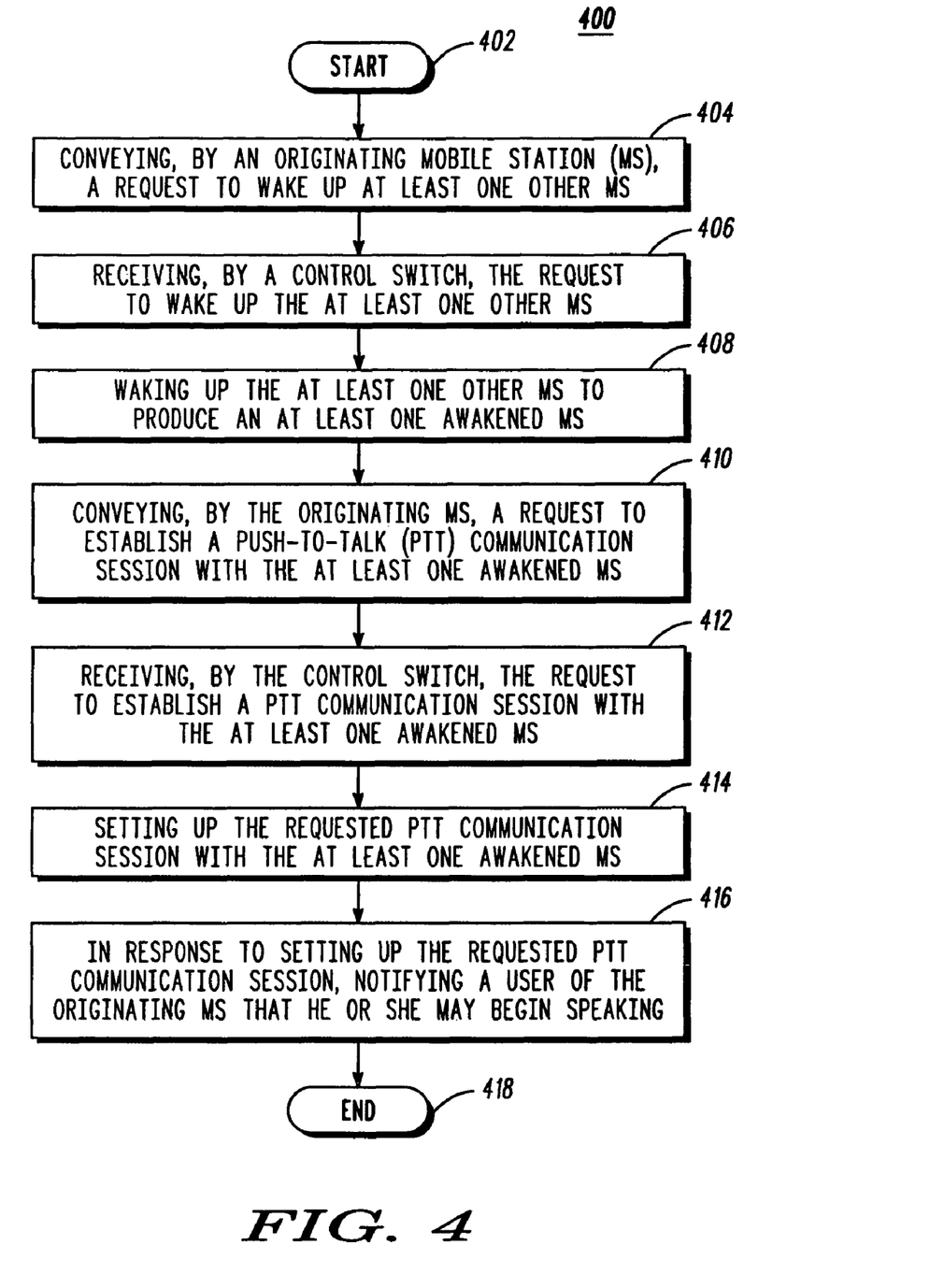
FIG. 4 is a logic flow diagram of a method executed by the communication system of FIG. 1 in establishing a Push-to-Talk (PTT) phone call in accordance with various embodiments of the present invention.

Referring now to FIG. 4, a logic flow diagram 400 is provided that illustrates an establishment of a Push-to-Talk (PTT) call in accordance with various embodiments of the present invention. A PTT call may be set up by any MS 102-104 in communication system 100 with any other MS or user, or any group of MSs or users, in the communication system. For example, any PTT-capable MS 102-104 in communication system 100 may set up a PTT call with any other PTT-capable MS in the communication system. By way of another example, any member of a talkgroup, such any one of MSs 102-104 with respect to talkgroup 105, may originate a PTT call with any one or more of the other members of the talkgroup.

Logic flow diagram 400 begins (402) when a first, originating MS, such as MS 102, conveys (404) a 'wake up request' to infrastructure 150. The wake up request comprises a request to wake up at least a second MS, such as one or more of MSs 103 and 104, in communication system 100. Originating MS 102 conveys the wake up request to infrastructure 150 prior to a user of MS 102 conveying, to the infrastructure, a request to set up a Push-To-Talk (PTT) communication session.

In one embodiment of the present invention, originating MS 102 conveys the wake up request in response to receiving an indication from a user of the originating MS of the user's desire to initiate a PTT communication session. Those who are of ordinary skill in the art realize that a variety of actions of the user of MS 102 may be construed to be an indication of the user's desire to initiate a PTT communication session. For example, originating MS 102 may convey the wake up request in response to the user instructing MS 102 to open the phone book maintained in the at least one memory device 308 of the originating MS 102. By way of another example, originating MS 102 may convey the wake up request in response to receiving a power up instruction from the user of the MS, such as when a user of the MS opens a clamshell-design MS or depresses a power up key in user interface 302.

In response to receiving (406) the wake up request, infrastructure 150, and in particular control switch 146, wakes up (408) at least one MS 103, 104 included in the wake up list associated with originating MS to produce at least one awakened MS. When the 'wake up list' is maintained in the originating MS, the MS may convey the wake up list to infrastructure 150 as part of the 'wake up request.' When the 'wake up list' is maintained in infrastructure 150, the wake up request may include a mobile ID associated with originating MS 102 and may request that system 100 wake up all MSs associated with the 'wake up list' corresponding to the originating MS's mobile ID.

In one embodiment of the present invention, step 408 may then comprise the following steps. In response to receiving the wake up request, control switch 146 determines a location of each MS 103, 104 associated with the wake up list by reference to Location Database 142. Control switch 146 then instructs each BSS 120, 130 servicing an MS associated with the 'wake up list' to broadcast a paging message to the 'wake up list' MS(s) serviced by the BSS. In response to receiving the instruction from control switch 146, each BSS 120, 130 serving an MS associated with the wake up list broadcasts a paging message via a paging channel in a respective air interface 107, 108.

Each paging message broadcast by a BSS 120, 130 identifies each MS that is associated with the wake up list and serviced by the BSS. In one embodiment of the present invention, the paging message may include the mobile IDs associated with each such MS. In another embodiment of the present invention, when the wake up list comprises all members of a talkgroup, such as talkgroup 105, the paging message may comprise a talkgroup ID associated with the talkgroup in addition to, or instead of, the mobile IDs. In response to receiving the paging message, each MS 103, 104 determines that it is an intended recipient of the paging message, wakes up, and conveys a paging response back to control switch 146 indicating that the MS is awake.

If the user has not already so instructed originating MS 102, the user may then instruct originating MS 102 to open the phone book comprising MSs and/or talkgroups that may be engaged in a PTT communication session. The instruction may be input into originating MS 102 concurrent with infrastructure 150 waking up the MSs 103, 104 associated with the wake up list. In response to receiving the instruction from the user, originating MS 102 retrieves the phone book from the one or more memory devices 308 of the MS and displays the phone book on display screen 304 of user interface 302. The user of originating MS 102 may then select one or more MSs and/or talkgroups from the displayed phone book and instructs MS 102, by depressing an appropriate key or touching an appropriate softkey in user interface 302 of the MS, to set up a PTT communication session with the selected one or more MSs and/or talkgroups. In response to receiving the instruction, originating MS 102 conveys (410) a request, such as a call origination message, to infrastructure 150 to set up a PTT communication session with the selected one or more MSs and/or talkgroups.

In response to receiving (412) the request to set up the PTT communication session, communication system 100 proceeds to set up (414) the requested PTT communication session. The procedure for setting up a PTT communication session is well-known in the art and will not be described in detail here, except that when the set up procedure engaged in by communication system 100 includes an MS 103, 104 that is associated with the wake up list, the communication system need not engage in a process of waking up the called MS as the called MS has already been awakened, or is in the process of being awakened, by infrastructure 150 in response to the receipt by the infrastructure of the wake up request. As a result, communication system 100 provides for an expedited set up of the PTT communication session.

As part of the call setup procedure, communication system 100 establishes a traffic channel in air interface 106 between originating MS 102 and infrastructure 150 for conveyance of voice traffic. Further, as part of the call setup procedure, infrastructure 150 further establishes a traffic channel between infrastructure 150 and each of the at least one awakened and called MS 103, 104 in a respective air interface 107, 108 associated with the MS. In response to the establishment of the traffic channels in the air interface 106 corresponding to MS 102 and an air interface 107, 108 corresponding to the at least one called MS 103, 104, the user of originating MS 102 is then notified (416) that he or she may commence speaking. Logic flow diagram 400 then ends (418).

Preferably, originating MS notifies the user that he or she may commence speaking by playing a Talk Permit Tone (TPT) to the user of originating MS 102. In one embodiment of the present invention, upon establishing a traffic channel to at least one called MS 103, 104, infrastructure 150, in particular control switch 146, conveys the TPT to originating MS 102 and the originating MS plays the TPT to the user of the MS. In another embodiment of the present invention, upon establishing a traffic channel to at least one called MS 103, 104, infrastructure 150, in particular control switch 146, conveys an instruction to play a TPT to the originating MS. In response to receiving the instruction, originating MS 102 retrieves a digitally stored TPT from the at least one memory device 308 of the MS and converts the TPT to an audio signal that is then played to the user of the MS. Upon receiving the TPT, the user of originating MS may then begin speaking by first depressing a PTT key, or touching a PTT softkey, of the MS's user interface 302.

By providing a 'wake up list' of MSs, such as MSs 103 and 104, that may be awakened by communication system 100 prior to an originating MS requesting to set up the PTT communication session, an amount of time incurred in setting up a PTT communication session and the delay before a user of the originating MS may begin to speak is reduced. As the MSs on the 'wake up list' are awakened prior to an originating MS requesting to set up the PTT communication session, communication system 100 need not engage in a process of waking up such called MSs in response to the receipt by infrastructure 150 of the request to set up the PTT communication session. As a result, communication system 100 provides for an expedited set up of the PTT communication session. Since the setup delay and the time that the user may first begin speaking are important marketing features of a PTT communication system, any reduction of setup delay and time until a user may begin speaking increases the marketability of PTT services offered by an operator of a communication system, such as communication system 100.

Figure 5A:
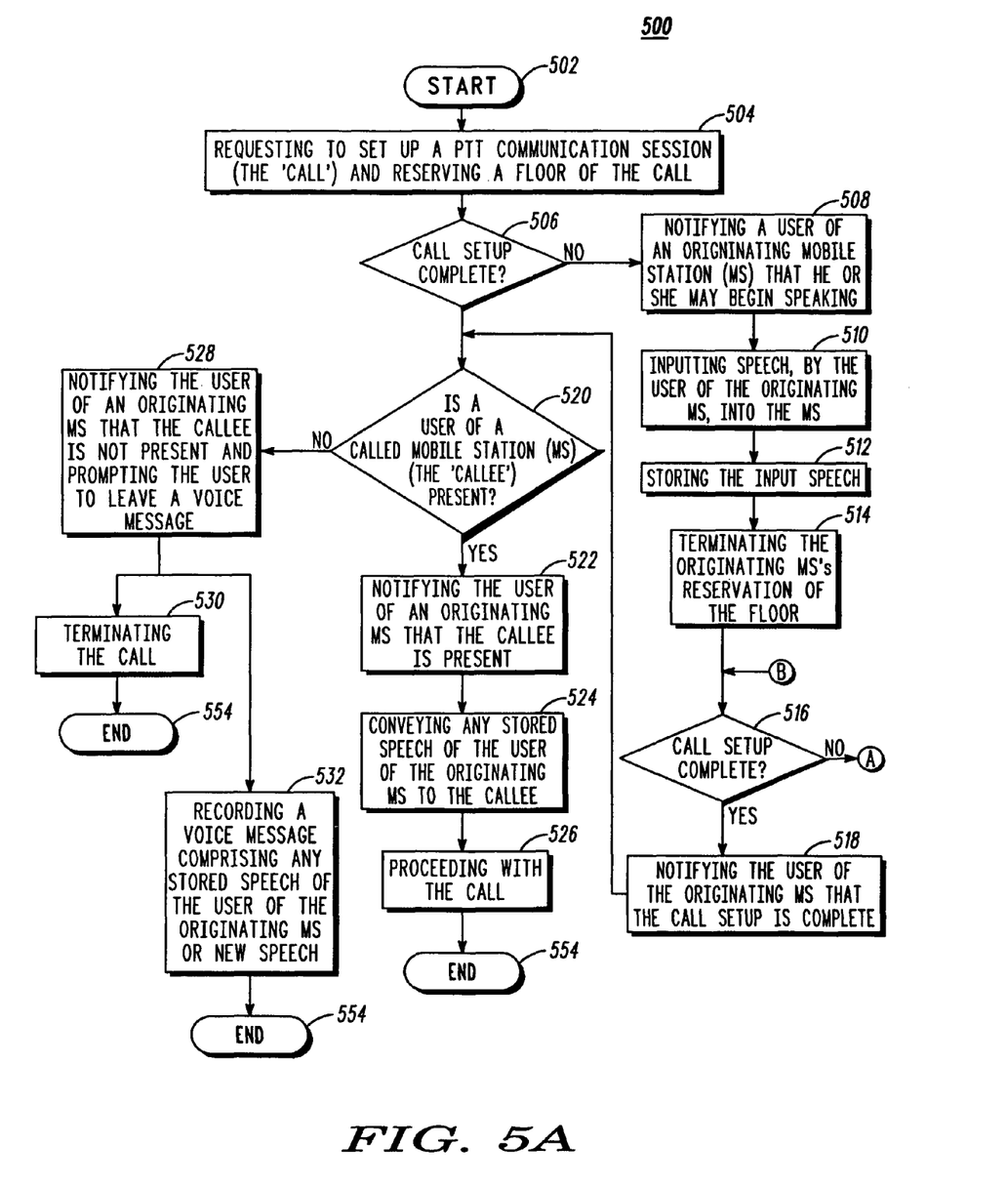
FIG. 5A is a logic flow diagram of a method executed by the communication system of FIG. 1 in setting up a PTT phone call in accordance with another embodiment of the present invention.
Figure 5B:
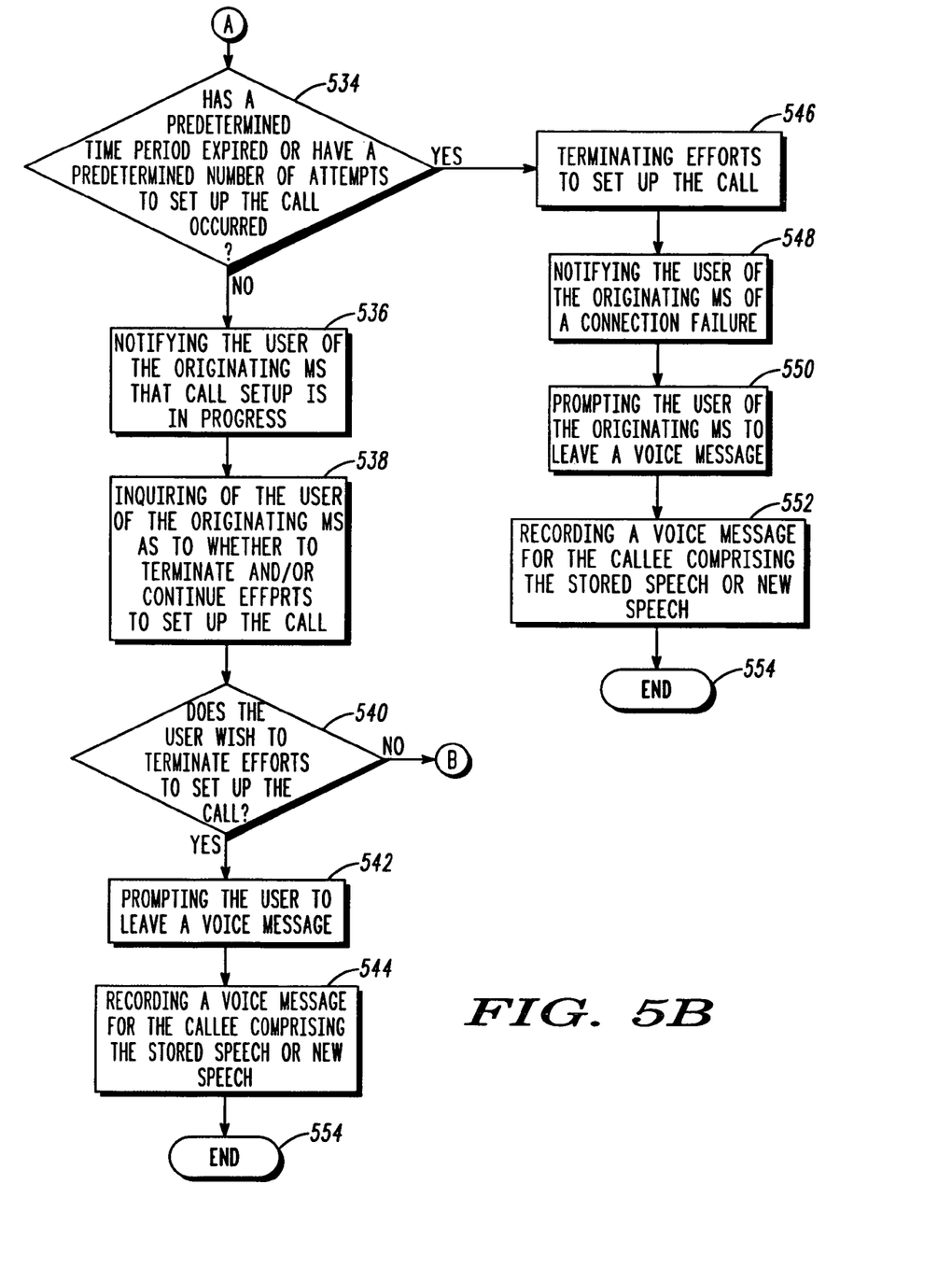
FIG. 5B is a continuation of the logic flow diagram of FIG. 5A depicting a method executed by the communication system of FIG. 1 in setting up a PTT phone call in accordance with another embodiment of the present invention.

To further reduce the delay between a time that a user of an originating MS, such as MS 102, requests to set up a PTT communication session and the time that the user may then begin to speak, communication stem 100 may further permit the user to begin speaking prior to completion of the setup of the PTT communication session, or call. Referring now to FIGS. 5A and 5B, a logic flow diagram 500 is provided that illustrates an establishment of a Push-to-Talk (PTT) communication session in accordance with another embodiment of the present invention. Logic flow diagram 500 begins (502) when user of a first, originating MS, such as MS 102, depresses a PTT key or touches a PTT softkey of user interface 302 of the MS. In response to the user depressing or touching the PTT key or softkey, MS 102 (504) conveys a request to the infrastructure to set up a PTT communication session and further reserves a floor of the communication session being set up until such a reservation is terminated, for example, when the user of MS 102 determines to relinquish the floor by releasing the PTT key or when infrastructure 100 terminates the user's reservation. Unless otherwise specified herein, each function performed by any one of MSs 102-104 is performed by a respective processor 306 of the MS.

In response to receiving the request, communication system 100 proceeds to set up the requested PTT communication session by allocating traffic channels in air interface in air interface 106 between originating MS 102 and infrastructure 150 for conveyance of voice traffic. Further, as part of the call setup procedure, infrastructure 150 pages each called MS, such as MS 103, that is, a 'callee.' Upon receiving a page response from a paged MS, that is, MS 103, infrastructure 150 further establishes a traffic channel between the infrastructure and the responding MS 103 in a corresponding air interface 107. When the setup of a PTT communication session with the called MS is complete, infrastructure 150 so informs originating MS 102, preferably by conveying a setup complete message to the MS.

In one embodiment of the present invention, communication system 100 may permit the user of originating MS to begin speaking while the PTT call is being setup. In such an embodiment, while the call setup is in progress (506), MS 102 notifies (508) the user that that he or she may commence speaking. For example, MS 102 may notify the user that a call setup is in progress or MS 102 may merely notify the user that the user may begin talking, for example by playing a conventional notification such as a Talk Permit Tone (TPT). Preferably, the notification may be stored in the at least one memory device 308 of MS 102 and is retrieved from the at least one memory device by the MS and played to the user.

Upon receiving the notification that he or she may begin talking, the user of originating MS 102 may then begin (510) speaking and may continue speaking until the user's reservation of the floor of the communication session is terminated (514), for example, by the user releasing the PTT key or softkey or by infrastructure 150 terminating the user's reservation of the floor. When the user of MS 102 begins speaking prior to completion of the setup of the communication session, MS 102 stores (512) the user's speech in a speech buffer 310 included in the at least one memory device 308 of the MS.

When, at step 510, the user of MS 102 began speaking prior to completion of call setup and, at step 514, the user's reservation of the floor of the communication session is terminated, MS 102 then determines (516) whether the call setup is complete. When, at step 516, MS 102 determines that the setup is complete, the MS notifies (518) the user of the MS that the call setup is complete, preferably by displaying an audio and/or visual cue, via user interface 302 of the MS, corresponding to a call setup complete message that is stored in the at least one memory device 308 of the MS. Infrastructure 150 further determines (520) whether the user of the called MS, that is, MS 103, is present and so informs MS 102. In one embodiment of the present invention, infrastructure 150 may determine whether the user of the called MS is present based on whether the called MS is registered in system 100, for example, by reference to Location Database 142 or by reference to a Presence Server (not shown) located in infrastructure 150 and coupled to IP network 140. In another embodiment of the present invention, infrastructure 150 may determine whether the user of called MS 103 is present based on whether the user of the called MS has answered the call.

When the PTT communication session is set up and the user of the called MS is present, infrastructure 150 informs MS 102, and MS 102 notifies (522) the user of MS 102 of the presence of the called party, preferably by displaying an audio and/or visual cue that is stored in the in the at least one memory device 308 of MS 102 and displayed via user interface 302 of the MS. The speech stored in buffer 310 of MS 102 is then conveyed (524) by MS 102 to MS 103 and the communication session proceeds as a conventional PTT communication session, wherein the user of MS 102 may continue speaking (526) until MS 102's reservation of the floor of the communication session is terminated. Logic flow 500 then ends (554).

When, at step 516, MS 102 determines that the call setup is complete and, at step 520, infrastructure 150 determines that the user of the called MS, that is, MS 103, is not present, MS 102 notifies (528) the user of MS 102 that the called party is not present and prompts the user of MS 102 to leave a voice message for the called MS, such as one or more of a voice message comprising the speech stored in buffer 310 or a voice message comprising new speech. Preferably, the notification and prompt are stored in the at least one memory device 308 of MS 102 and displayed by MS 102 via user interface 302 of the MS.

In response to the notification and prompt, the user may terminate (530) the call or may convey (532) any speech stored in buffer 310 of MS 102 or new speech as a voice message by selecting an appropriate icon, key, or softkey in user interface 302 of the MS. In response to receiving an instruction to convey the stored speech to the called MS as a voice mail message, originating MS 102 conveys the speech stored in buffer 310 of MS 102 to a memory location in infrastructure 150 at is associated with MS 103, where the stored speech is recorded as a voice message for MS 103. In response to receiving an instruction to convey a new speech message to the called MS as a voice mail message, originating MS 102 prompts the user of the originating MS for a new speech message via an audio and/or visual prompt that is stored in the at least one memory device 308 of originating MS 102 and is displayed on display screen 304 of user interface 302 of the MS. In response to the prompt, the user of originating MS 102 inputs into the MS, and the originating MS receives from the user, a new speech message. Originating MS 102 then conveys the new speech message to the memory location in infrastructure 150 at is associated with MS 103, where the stored speech is recorded as a voice message for MS 103. Logic flow 500 then ends (554).

When, at step 516, MS 102 determines that the call setup is not complete, and infrastructure 105 determines (534) that a predetermined time period has not yet expired and/or a predetermined number of unsuccessful attempts to set up the call have not yet occurred, such as a predetermined number of unsuccessful attempts to page called MS 103 or a predetermined number of unsuccessful attempts to establish traffic channels to called MS 103, communication system 100, and in particular originating MS 102, notifies (536) the user of MS 102 that a call setup is in progress. Communication system 100, preferably originating MS 102 or control switch 146 via MS 102, also inquires (538) of the user of MS 102, via a text message or an icon displayed on display screen 304 of user interface 302 of MS 102 and that is stored in the at least one memory device 308 of the MS, as to whether to terminate and/or continue efforts to set up the call.

In response to the inquiry, originating MS 102 may receive (540), from the user of the MS, an instruction to terminate efforts to set up the call or to continue efforts to set up the call, or may receive no response, which may be interpreted as an instruction to continue to set up the call. When the user does not elect, at step 540, to terminate efforts to set up the call, that is, when the user elects to continue with efforts to set up the call or fails to elect to terminate efforts to set up the call, logic flow diagram 500 proceeds to step 516. When the user elects, at step 540, to terminate efforts to set up the call, MS 102 prompts (542) the user of MS 102 to leave a voice message, such as one of more of a voice message comprising the speech stored in buffer 310 of MS 102 or a voice message comprising new speech, for the called party. Preferably the prompt is stored in the at least one memory device 308 of MS 102 and displayed by MS 102 via user interface 302 of the MS.

Upon determining, at step 516, that the call setup is not complete, and after, at step 534, expiration of the predetermined time period and/or after occurrence of the predetermined number of unsuccessful attempts to set up the call, infrastructure 150 may terminate (546) the efforts to establish the call, for example, may cease paging called MS 103 or may cease attempting to establish traffic channels to the MS. In response to terminating efforts to establish the call, infrastructure 150 informs MS 102 of a connection failure. MS 102, in turn, notifies (548) the user of the MS of the connection failure and prompts (550) the user to leave a voice message for the called party, such as a voice message comprising the speech stored in buffer 310 or a voice message comprising new speech. Preferably the notification and prompt are stored in the at least one memory device 308 of MS 102 and displayed by the MS via user interface 302 of the MS.

In response to the prompt at step 542 or step 550, the user of MS 102 may convey (544, 552) the speech stored in buffer 310 of MS 102 or new speech as a voice message by selecting an appropriate icon, key, or softkey in user interface 302 of the MS. In response to receiving an instruction to convey the stored speech to the called MS, that is, MS 103, as a voice mail message, originating MS 102 conveys the speech stored in buffer 310 of MS 102 to a memory location in infrastructure 150 at is associated with MS 103, where the stored speech is recorded as a voice message for MS 103. In response to receiving an instruction to convey a new speech message to the called MS as a voice mail message, originating MS 102 prompts the user of the originating MS for a new speech message via an audio and/or visual prompt that is stored in the at least one memory device 308 of originating MS 102 and is displayed on display screen 304 of user interface 302 of the MS. In response to the prompt for a new speech message, the user of originating MS 102 inputs into the MS, and MS 102 receives from the user, a new speech message. Originating MS 102 then conveys the new speech message to the memory location in infrastructure 150 that is associated with MS 103, where the stored speech is recorded as a voice message for MS 103. Logic flow 500 then ends (554).

In yet another embodiment of the present invention, communication system 100 the user of originating MS might not begin speaking until the PTT call is setup. In such an embodiment, when, at step 506, the call is set up, infrastructure 150 determines (520) whether the user of the called MS, such as MS 103, is present and so informs MS 102. When the PTT communication session is set up and the user of the called MS is present, logic flow diagram 500 then proceeds to step 522 as is described above. When the PTT communication session is set up and the user of the called MS is not present, logic flow diagram 500 then proceeds to step 528 as is described above.

By permitting the user of originating MS 102 to begin speaking prior to completion of the setup of the call, a delay between a time that the user of the originating MS determines to initiate a PTT phone call and the time that the user may then begin to speak is reduced. Since the user may be permitted to begin speaking prior to completion of the setup of the call, the speech input by the user into originating MS 102 is stored in a buffer 310 of the MS. When the call is setup and the user of the called MS, such as MS 103, is present, the stored speech is then conveyed to the called MS. Since speech compression algorithms compress a length of speech received by an originating mobile station such that it consumes, and is transmitted in, a shorter interval than the spoken interval, which speech is then decompressed by a receiving mobile station to fill the original spoken interval, the stored speech may be conveyed to called MS 103, decompressed, and played out with minimal disruption to the subsequent conversation. If attempts to set up the call are unsuccessful and the call is not set up or the call is set up but the user of called MS 103 is not present or determines to not accept the call, the stored speech may then be conveyed to the called MS as a voice message.

The stored speech, or new speech, may also be used as an alert that is played to a user of a called MS. That is, typically, when a called MS, such as MS 103 or MS 104, is woken up by infrastructure 150 and a traffic channel is established to the called MS as part of a PTT communication session, a "beep" or a "chirp" is played by the called MS to a user of the called MS. However, in another embodiment of the present invention, when a called MS 103, 104 is woken up by infrastructure 150 and a traffic channel is established to the called MS, an announcement comprising a spoken message from originating MS 102 may be conveyed to a user of the called MS. By providing an announcement comprising a spoken message from the originating MS to a user of the called MS, can choose to ignore the call, queue the call without listening to the audio message, queue the call after listening to the audio message, or answer the call.

Figure 6A:
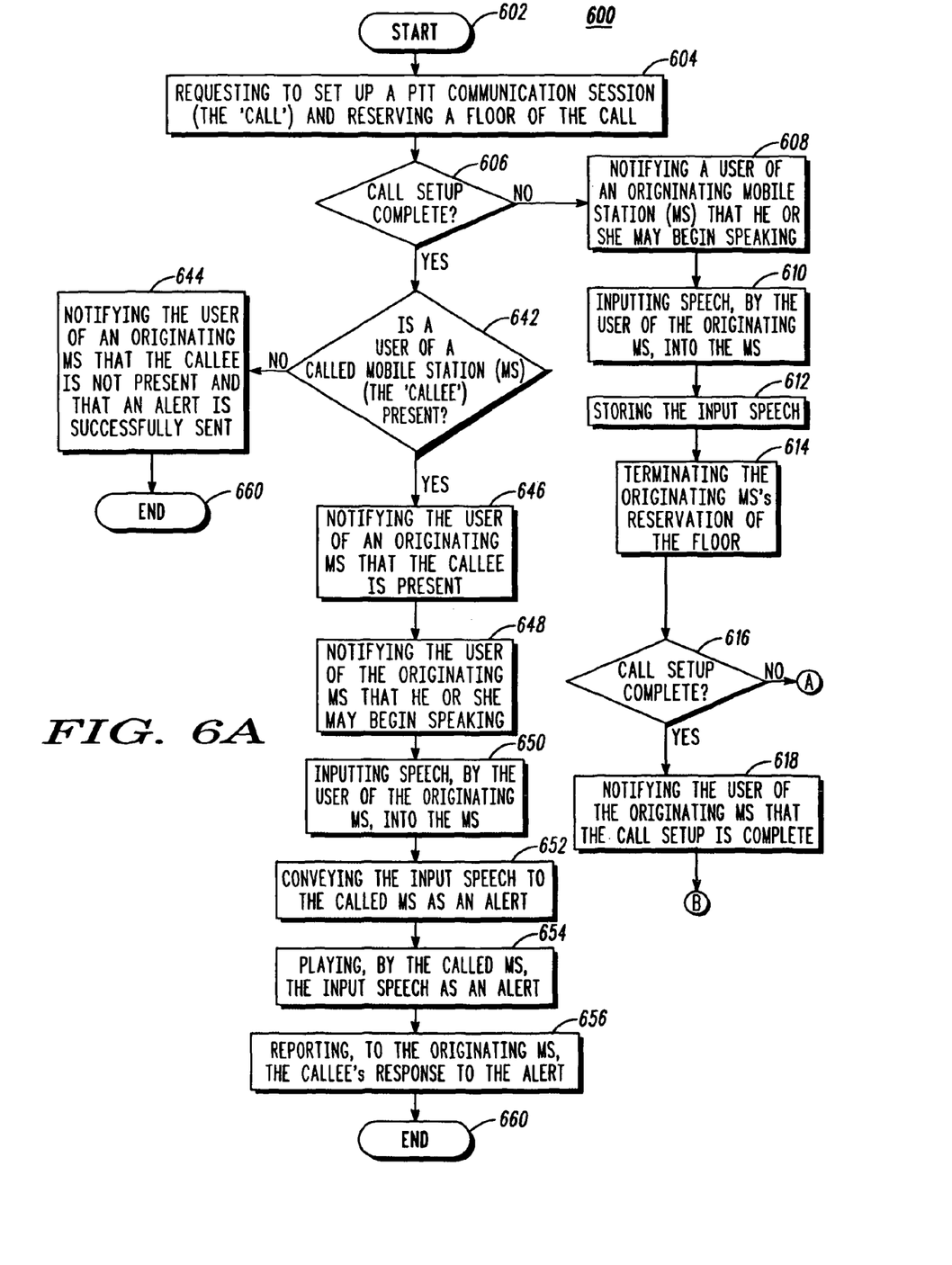
FIG. 6A is a logic flow diagram of a method executed by the communication system of FIG. 1 in conveying a voice alert to a called MS in accordance with another embodiment of the present invention.

FIG. 6 is a logic flow diagram 600 of a method executed by communication system 100 in conveying a voice alert to a called MS in accordance with another embodiment of the present invention. Similar to logic flow diagram 500, logic flow diagram 600 begins when user of a first, originating MS, such as MS 102, depresses a PTT key or touches a PTT softkey of user interface 302 of the MS. In response to the user depressing or touching the PTT key or softkey, MS 102 (604)

conveys a request to the infrastructure to set up a PTT session and further reserves a floor of the communication session being set up until the floor reservation is terminated, for example, when the user of MS 102 determines to relinquish the floor by releasing the PTT key or when infrastructure 100 terminates the user's reservation.

In response to receiving the request, communication system 100 proceeds to set up the requested PTT communication session by allocating traffic channels in air interface in air interface 106 between originating MS 102 and infrastructure 150 for conveyance of voice traffic. Further, as part of the call setup procedure, infrastructure 150 pages each called MS, such as MS 103, that is, a 'callee,' and upon receiving a page response from the MS, further establishes a traffic channel between infrastructure 150 and the responding MS 103 in a corresponding air interface 107. When the setup of a PTT communication session with the called MS is complete, infrastructure 150 so informs originating MS 102, preferably by conveying a setup complete message to the MS.

Similar to logic flow diagram 500, in one embodiment of the present invention, communication system 100 may permit the user of originating MS to begin speaking while the PTT call is being setup. In such an embodiment, while the call setup is in progress (606), MS 102 notifies (608) the user that that he or she may commence speaking. Upon receiving the notification that he or she may begin talking, the user of originating MS may then begin (610) speaking and may continue speaking until the user's reservation of the floor of the communication session is terminated (614), for example, by the user releasing the PTT key or softkey or by infrastructure 150 terminating the user's reservation of the floor. When the user of MS 102 begins speaking prior to completion of the setup of the communication session, MS 102 stores (612) the user's speech in a speech buffer 310 included in the at least one memory device 308 of the MS.

When, at step 610, the user of MS 102 began speaking prior to completion of call setup and, at step 614, the user's reservation of the floor of the communication session is terminated, MS 102 then determines (616) whether the call setup is complete. When, at step 616, MS 102 determines that the setup is complete, the MS notifies (618) the user of the MS that the call setup is complete, preferably by displaying an audio and/or visual cue, via user interface 302 of the MS, corresponding to a call setup complete message that is stored in the at least one memory device 308 of the MS. Infrastructure 150 further determines (620) whether the user of the called MS, such as MS 103, is present and so informs MS 102.

Figure 6B:
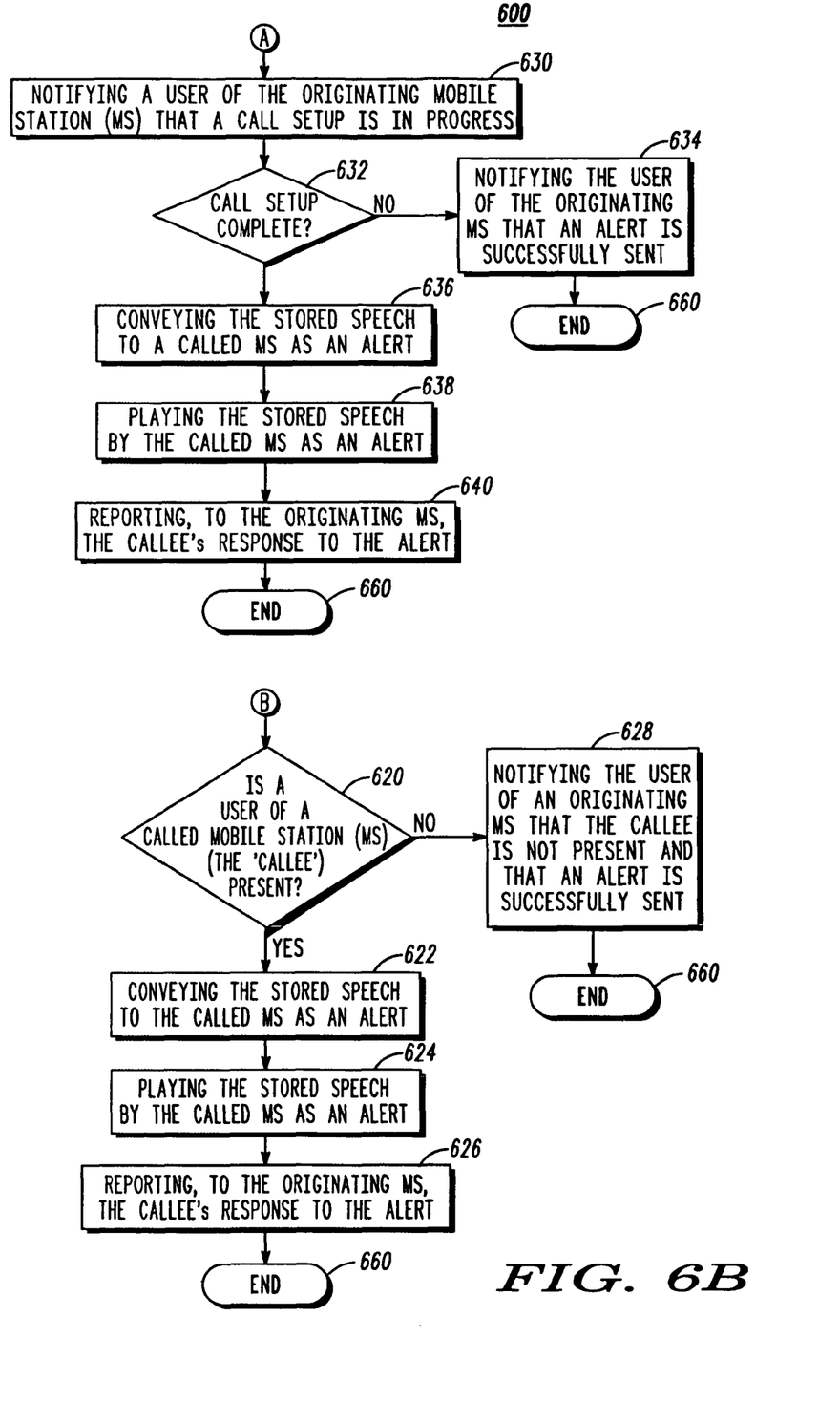
FIG. 6B is a continuation of the logic flow diagram of FIG. 6A depicting a method executed by the communication system of FIG. 1 in conveying a voice alert to a called MS in accordance with another embodiment of the present invention.

When, at step 616, infrastructure 150 determines that the PTT communication session is set up and further determines, at step 620, that the user of called MS 103 is present, MS 102 conveys (622) the speech stored in buffer 310 to MS 103, and called MS 103 plays (624) the received speech to the user of MS 103 as an announcement, that is, as an alert. In response to receiving the alert, the user of MS 103 may choose to ignore the call, queue the call without listening to the audio message, queue the call after listening to the audio message, or answer the call. MS 103 then conveys (626) the user's response to the alert to originating MS 102 via infrastructure 150 and logic flow 600 ends (660). When the PTT communication session is set up and the user of the called MS is not present, MS 102 notifies (628) the user of the MS that the callee is not present and that the alert has been successfully sent, and logic flow 600 ends (660).

When, at step 616, infrastructure 150 determines that the PTT communication session is not set up, MS 102 notifies (630) the user of MS 102 that a call setup is in progress. When attempts to complete the call are terminated (632) prior to the call being setup, for example, upon expiration of a predetermined time period or after a predetermined number of unsuccessful setup attempts, the user of originating MS 102 is notified (634) that an alert has been successfully sent to called MS 103 and logic flow 600 ends (660). When, at step 632, the call is setup prior to such termination, the speech stored in buffer 310 is conveyed (636) to called MS 103, and called MS 103 plays (638) the received speech to the user of MS 103 as an announcement, that is, an alert. Again, in response to receiving the alert, the user of MS 103 may choose to ignore the call, queue the call without listening to the audio message, queue the call after listening to the audio message, or answer the call. MS 103 then conveys (640) the user's response to the alert to originating MS 102 via infrastructure 150 and logic flow 600 the ends (660).

In another embodiment of the present invention, the user of originating MS 102 might not begin speaking until the call is set up. In such an embodiment, when the call is set up (606), infrastructure 150 determines (642) whether the user of the called MS, such as MS 103, is present and so informs MS 102. When the PTT communication session is set up and the user of the called MS is not present, the user of originating MS 102 is notified (644) that the user of called MS 103 is not present and that an alert has been successfully sent to the called MS. Logic flow 600 then ends (660).

When, at step 606, the PTT communication session is set up and the user of the called MS is present, MS 102 notifies (646, 648) the user of MS 102 that the user of called MS 103 is present and that he or she may commence speaking. Upon receiving the notification that he or she may begin talking, the user of originating MS 102 may then begin (650) speaking. MS 102 conveys (652) the speech input into MS 102 by the user of the MS to called MS 103, and called MS 103 plays (654) the received speech to the user of MS 103 as an announcement, that is, an alert. Again, in response to receiving the alert, the user of MS 103 may choose to ignore the call, queue the call without listening to the audio message, queue the call after listening to the audio message, or answer the call. MS 103 then conveys (656) the user's response to the alert to originating MS 102 via infrastructure 150 and logic flow 600 ends (660).

By using the received speech as an announcement of a call instead of the "beep" or "chirp" is typically used to announce a call to a user of the called MS, the user of the called MS is provided information that allows the user to determine whether to ignore the call, queue the call without listening to the audio message, queue the call after listening to the audio message, or answer the call. Thus a user of the called MS is provided greater information on which to make a decision as to whether to accept a call and further whether to incur the costs associated with engaging in a wireless communication via a mobile station, which costs may be billed based on an amount of airtime consumed by the user.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for establishing a Push-To-Talk (PTT) communication session in a wireless communication system, the method comprising:
   receiving a request from a user of a first mobile station to set up a PTT communication session;
   receiving speech from the user prior to completion of the set up of the communication session;
   conveying the received speech to a second mobile station;
   receiving, by the second mobile station, the conveyed speech; and
   playing, by the second mobile station, the received speech as a PTT alert.

2. The method of claim 1, further comprising determining whether a user of the second mobile station is present, and wherein conveying the stored speech comprises, when the user of the second mobile station is present, conveying the received speech to a user of the second mobile station.

3. The method of claim 1, wherein the step of receiving speech comprises:
   receiving a request from the user of the first mobile station to reserve a floor of the communication session; and
   in response to receiving the request to reserve a floor, receiving speech from the user of the first mobile station.

4. The method of claim 1, wherein receiving speech from the user comprises:
   determining whether a user of the second mobile station is present;
   when the user of the second mobile station is present, notifying the user of the first mobile station to begin speaking; and
   in response to the notification, receiving speech from the user of the first mobile station.

5. An apparatus for providing a call alert in a PTT communication session, the apparatus comprising a first mobile station that receives a request from a user of the first mobile station to set up a PTT communication session, receives speech from the user prior to completion of the set up of the communication session, conveys the received speech to a second mobile station, and wherein the apparatus further comprises the second mobile station that receives the speech from the first mobile station and plays the received speech as a PTT alert.

6. The apparatus of claim 5, wherein the first mobile station determines whether a user of the second mobile station is present and when the user of the second mobile station is present, conveys the received speech to the second mobile station.

7. The apparatus of claim 5, wherein the mobile station receives speech by receiving a request from the user of the first mobile station to reserve a floor of the communication session and, in response to receiving the request to reserve a floor, receiving speech from the user.

8. The apparatus of claim 5, wherein the first mobile station receives speech from the user by determining whether a user of the second mobile station is present, when the user of the second mobile station is present, notifying the user of the first mobile station to begin speaking and, in response to the notification, receiving speech from the user of the first mobile station.

* * * * *